May 14, 1968 A. L. GATISS 3,382,735
TRANSMISSIONS
Filed Sept. 9, 1965 9 Sheets-Sheet 4

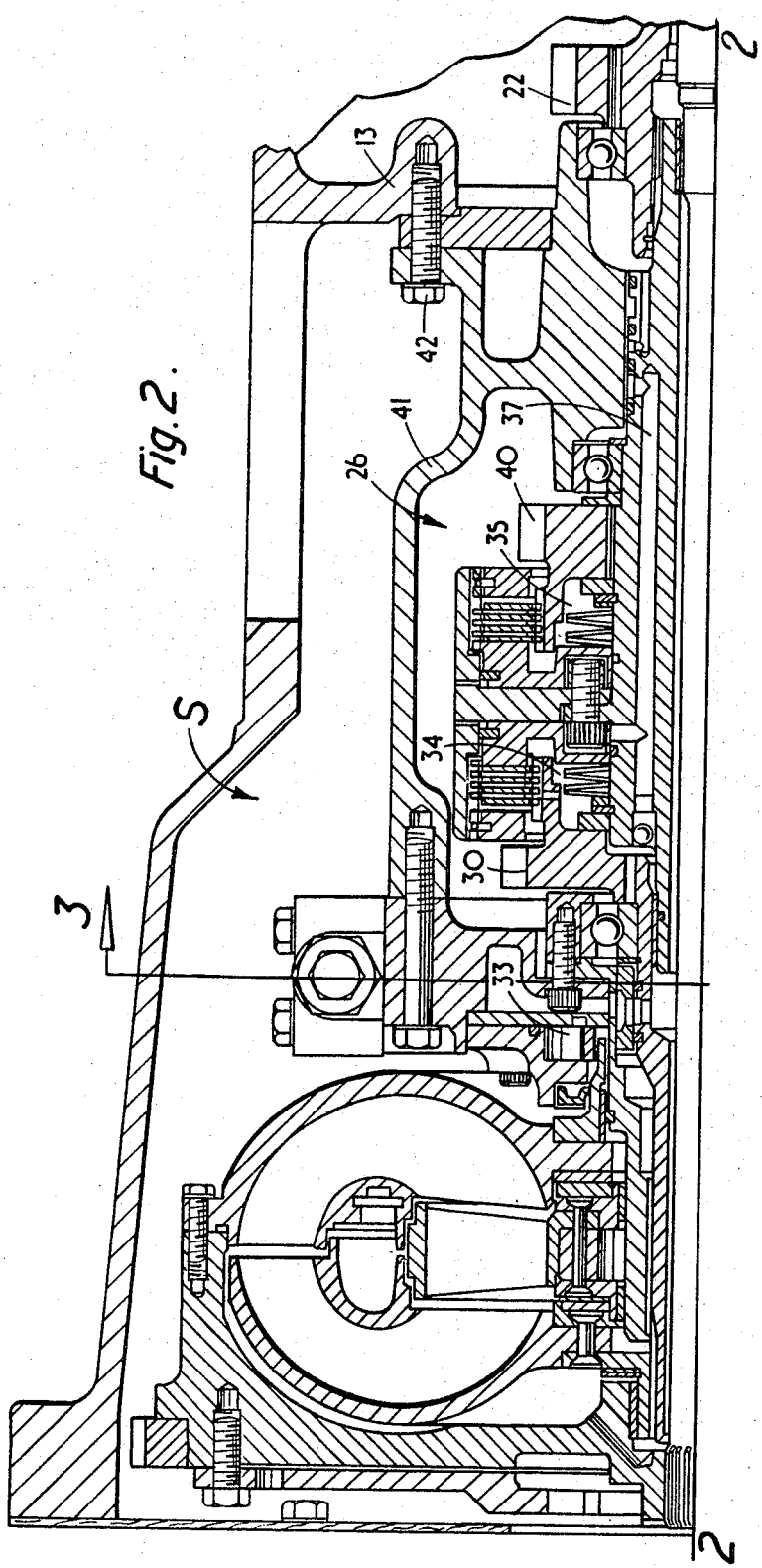

Inventor
Albert Leslie Gatiss
By Lucke & Lucke

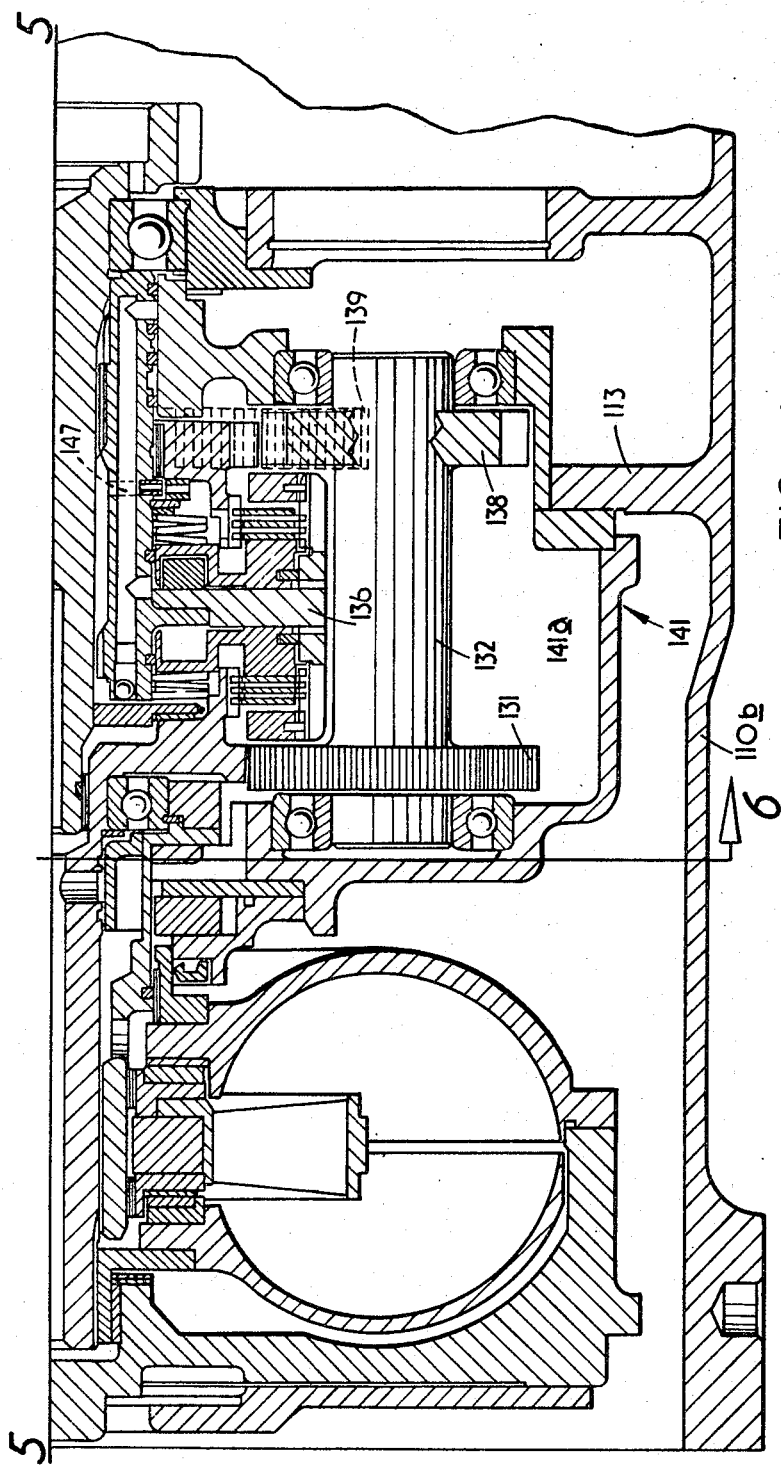

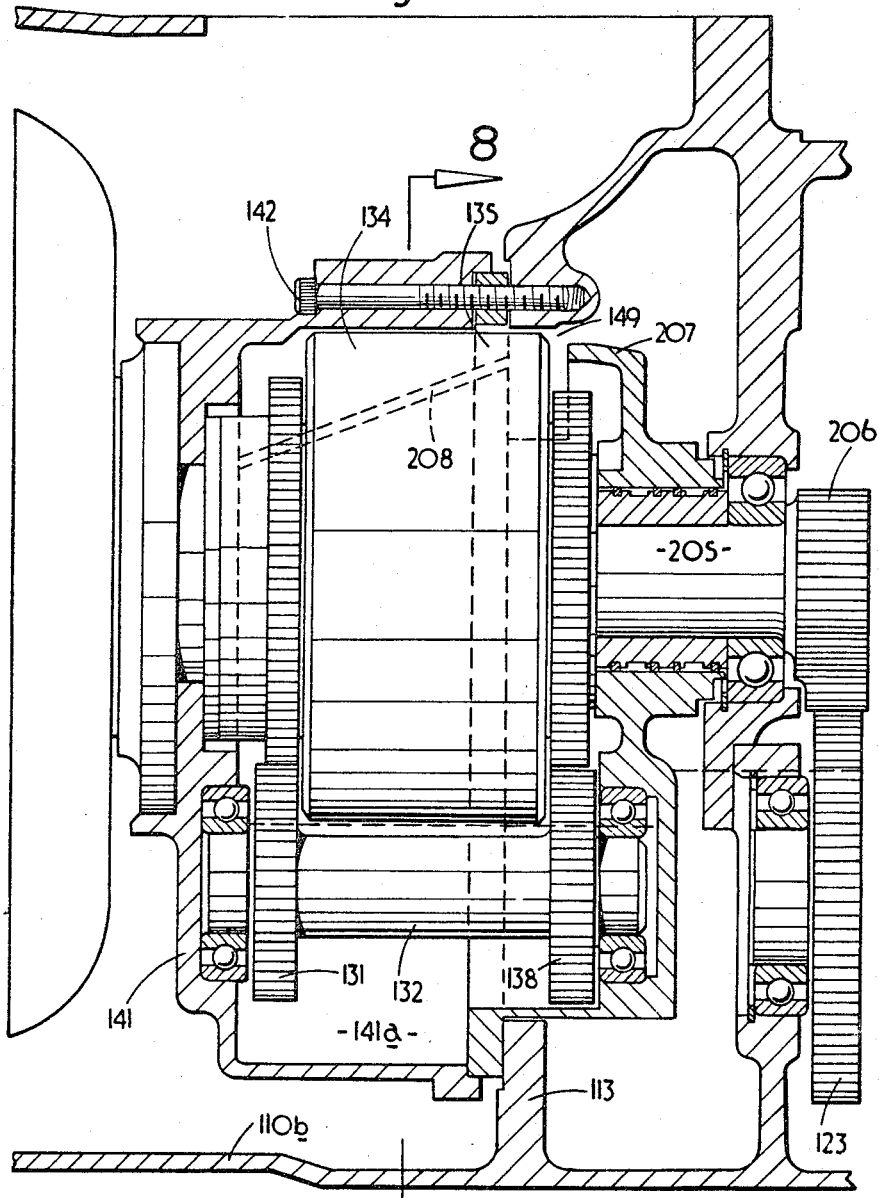

United States Patent Office 3,382,735
Patented May 14, 1968

3,382,735
TRANSMISSIONS
Albert Leslie Gatiss, Streetly, England, assignor to Brockhouse Engineering Limited, West Bromwich, England, a British company
Filed Sept. 9, 1965, Ser. No. 486,146
2 Claims. (Cl. 74—730)

ABSTRACT OF THE DISCLOSURE

A power transmitting apparatus having a transmission casing in which a hydro-kinetic torque converter and a power operated shift reversing mechanism replaces a conventional clutch drive mechanism.

---

This invention relates to power transmissions and is primarily concerned with power transmissions as used in agricultural tractors.

Power transmissions for agricultural tractors are already known comprising a gear case embodying an input portion adjacent the power unit and an output portion remote therefrom, in which input portion is housed one or more drive disconnecting clutches adapted to be driven from the power unit, with the one or more clutches being operable by a control member supported for pivotal movement in bearings mounted in two apertures formed in opposed walls of the input portion of the gear case, the input portion housing driving means for transmitting power to a power-take-off drive to the power-take-off shaft as commonly provided on agricultural tractors and also housing further driving means for transmitting power to a multi-speed gear accommodated in the output portion of the gear case, the multi-speed gear having an output member which is arranged to drive the tractor wheels or other ground engaging means, the multi-speed gear providing a plurality of forward gear ratios and at least one reverse gear ratio. In such known gear transmissions the output portion of the gear case is arranged to accommodate at least two parallel drive shafts one of which extends concentric with the crank shaft of the power unit and the other extending eccentric thereto with one of these two drive shafts arranged to provide the power-take-off drive and the other drive shaft constituting a drive shaft of the multi-speed gear. The gear case also embodies one or more integral internal mounting means such as webs or abutments which are adapted to support bearing assemblies for either one or both of these two parallel drive shafts. Such known power transmissions for agricultural tractors as aforedescribed are hereinafter referred to as known power transmissions of the kind specified.

With these known power transmissions of the kind specified the driving means for transmitting drive to the power-take-off drive may be constituted by disengageable gear driven by the or one of the drive disconnecting clutches or, alternatively, the driving means may be constituted by a driving shaft power driven directly from the power unit. Other forms of driving means may be employed, but the aforementioned two forms are the most commonly used.

The further driving means for the multi-speed gear in the known power transmissions of the kind above specified is usually constituted by a driving shaft extending concentric with the crankshaft of the power unit, drive being transmitted to this driving shaft from the power unit by the one or more clutches.

With the present increasing power of agricultural tractors and the general tendency to facilitate their operation by the user concerned, the aforementioned known power transmissions of the kind specified are being fitted to an increasing extent with power shift reversing gears.

There is a further increasing tendency to adapt agricultural tractors into machines for industrial use, for example shovel loaders and fork lift trucks. For these industrial applications and in some particular agricultural applications it is particularly advantageous to replace the one or more drive disconnecting clutches with a hydro-kinetic torque converter as well as to fit power shift reversing gears. This replacement of the one or more clutches by a hydro-kinetic torque converter together with power shift reversing gears is particularly important where a greater range of torque is required and the frequency of cycles of operation is to be increased beyond that with which the known power transmission arrangement can adequately be used. The provision of a hydro-kinetic torque converter provides a greater torque range without changing gear and, the rate of gear changing with power shift gears is far greater than that which can be accomplished by manual or non-power assisted operation as well as requiring less effort by the operator. For instance, the number of gear changes and reversals per minute when a shovel loader is being used normally would be of the order of 16 gear changes per minute and intermediate at least 4 of these gear changes maximum torque would be required. Whereas, when the tractor is being used for normal agricultural purposes the number of gear changes and reversals together with the use of maximum torque would be considerably less, for some operations of the order of 1 or 2 gear changes per minute, but usually the frequency of gear changes is much less.

The present invention has for its object the provision of a modified power transmission embodying a hydro-kinetic torque converter and power shift reversing gears suitable for agricultural and industrial tractors, which modified power transmission permits of the same identical form of gear casing being employed as has hitherto been provided with known power transmission of the kind specified embodying a change speed gear arranged to drive the wheels, or tracks in the case of a tracked tractor, together with the conventional clutch mechanism and driving means for a power-take-off drive.

A further object of the present invention is to provide means for converting a known power transmission of the kind specified to provide a modified power transmission embodying a hydro-kinetic torque converter and power shift reversing gears by replacing the one or more drive disconnecting clutches of the known power transmission by the hydro-kinetic torque converter and power shift reversing gears whilst retaining the original gear case and multi-speed gear, and if required, with certain known power transmissions the aforementioned power-take-off drive may also be retained.

By enabling the same identical form of gear case to be employed, an important economy in manufacture may be effected in that the same gear case may be fitted either with the modified power transmission according to the present invention or with the previously known arrangements just mentioned, thereby facilitating the economical manufacture of the gear case by mass production. This is very important as the gear case is a relatively large and complex component which could only be produced at extremely high cost if only a limited and small number were required.

Furthermore, not only may the same identical form of gear case be employed in the modified power transmission of the present invention, but also the same multi-speed gear arrangement may be utilised and in some instances the same power-take-off drive may be retained. Thus, the maximum number of casings and parts of one particular configuration consistent with the overall supply requirements of both the known form of power transmission of the kind specified and the modified power transmissions may be manufactured, whereby it becomes possible to effectively produce such casings and other parts by mass production methods at minimum cost, e.g., by highly mechanised founding processes or, automatic machining operations.

The conversion of known power transmissions to provide the modified power transmission of the present invention may also be effected economically as many of the expensive parts, in particular, the gear case, do not have to be replaced. Therefore, existing agricultural or industrial tractors may have their known power transmissions of the kind specified economically converted to increase their useful torque range and to provide power shift reverse gears.

According to the present invention we provide a modified power transmission for an agricultural or industrial tractor which modified power transmission comprises a gear case and multi-speed gear of a known power transmission of the kind specified and, further comprises a hydro-kinetic torque converter and power shift reversing gears mounted within the input portion of said gear case, the hydro-kinetic torque converter being arranged to be driven by the power unit of the tractor with the turbine element of the hydro-kinetic torque converter connected to the input member of the power shift reversing gear of which the output member is in driving connection with the power input member of said multi-speed gear housed in the output portion of said gear case, the power shift reversing gear being supported within said input portion from the integral internal mounting means of the gear case and operable by a control means extending through one of the apertures of the input portion of the gear case, the other aperture accommodating conduit means for the hydraulic fluid associated with the hydro-kinetic torque converter, the arrangement being such that the one or more drive disconnecting clutches and associated control means together with the further driving means for transmitting power to the multi-speed gear and/or the driving means for transmitting drive to the power-take-off drive, which in the known power transmission of the kind specified are all accommodated in the input portion of the gear case, are replaced by a hydro-kinetic torque converter and power shift reversing gear without modification of the overall configuration of the gear case and multi-speed gear to provide a modified power transmission providing for a multiplicity of gear ratios for reverse as well as forward drive.

According to the present invention we also provide conversion means for converting a power transmission of the kind specified to provide a modified power transmission embodying a hydro-kinetic torque converter and power shift reversing gears, said conversion means comprising, a hydro-kinetic torque converter adapted to be driven from a power unit; power shift reversing gears embodying clutch means and having an input member in driving engagement with the turbine element of the hydro-kinetic torque converter and, further having an output member adapted to drive the power input member of multi-speed gearing; a housing supporting therewithin the power shift reversing gear and providing an oil sump therefor to retain oil utilised by said power shift reversing gearing, the housing being provided with mounting means adapted to support the housing and its associated mechanism in a gear case; oil discharge means within said housing arranged to discharge excess oil from the oil sump, with said oil discharge means having at least one rotatable member arranged to effect oil discharge; valve means for controlling the operation of the power shift reversing gears and conduit means for conducting hydraulic fluid to and from the hydro-kinetic torque converter, the conversion means being such that the hydro-kinetic torque converter and power operated shift reversing gears may be fitted into a gear case of a known power transmission of the kind specified without modification to the overall configuration of the gear case.

The aforedescribed conversion means for converting known power transmissions includes a housing providing an oil sump for the power shift reversing gears and further, oil discharge means are provided to remove excess oil from this oil sump. It will be appreciated that in the known power transmissions of the kind specified the multi-speed gearing will generally be provided with an oil sump constituted by the gear case, the level of oil in which may vary considerably in accordance with the conditions obtaining either in the transmission unit or in the tractor. By providing the power shift reversing gear with an independent oil sump whose oil level may be maintained not more than a designed maximum, the operation of the power shift reversing gears will not be impeded by the presence of excessive oil.

This feature is most important when the power shift reversing gear embodies two friction clutches which in known manner would normally be rotating when the power unit is operating. If the oil level in the gear case is such that the clutches are partially immersed in oil then the oil drag effective on the clutches would be so great that the power unit may not be able to run at its designed efficiency. By providing the power shift reversing gear in a housing having oil discharge means the level of oil in the oil sump of the housing may be maintained at that required quite independently of the level obtaining in the oil sump of the multi-speed gear also housed in the gear case.

Two embodiments of the present invention will now be described with reference to the accompanying drawings wherein:

FIGURE 1 is a schematic cross sectional side view of a first known form of tractor power transmission of the kind specified having a gear case in which the power-take-off drive shaft is concentric with the crank shaft of the power unit and, in which the output drive shaft from a multi-speed gear extends parallel to and spaced from the power-take-off drive shaft;

FIGURES 2 and 2A comprise an enlarged cross-sectional side view of the hydro-kinetic torque converter and power shift reversing gears adapted to be fitted in the input portion of the gear case of FIGURE 1 adjacent the power unit of the tractor, the two figures being views on opposite sides of the centre line 2—2;

Figure 6:
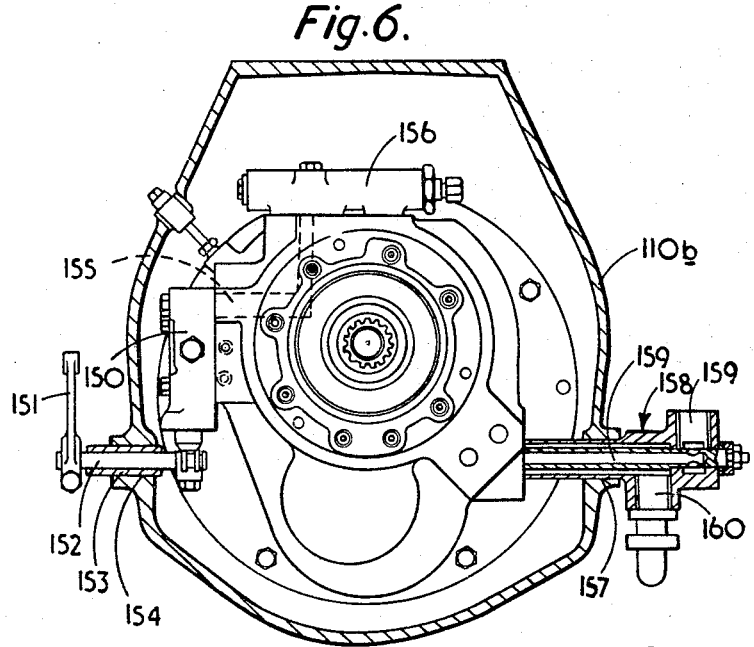
Figure 4:
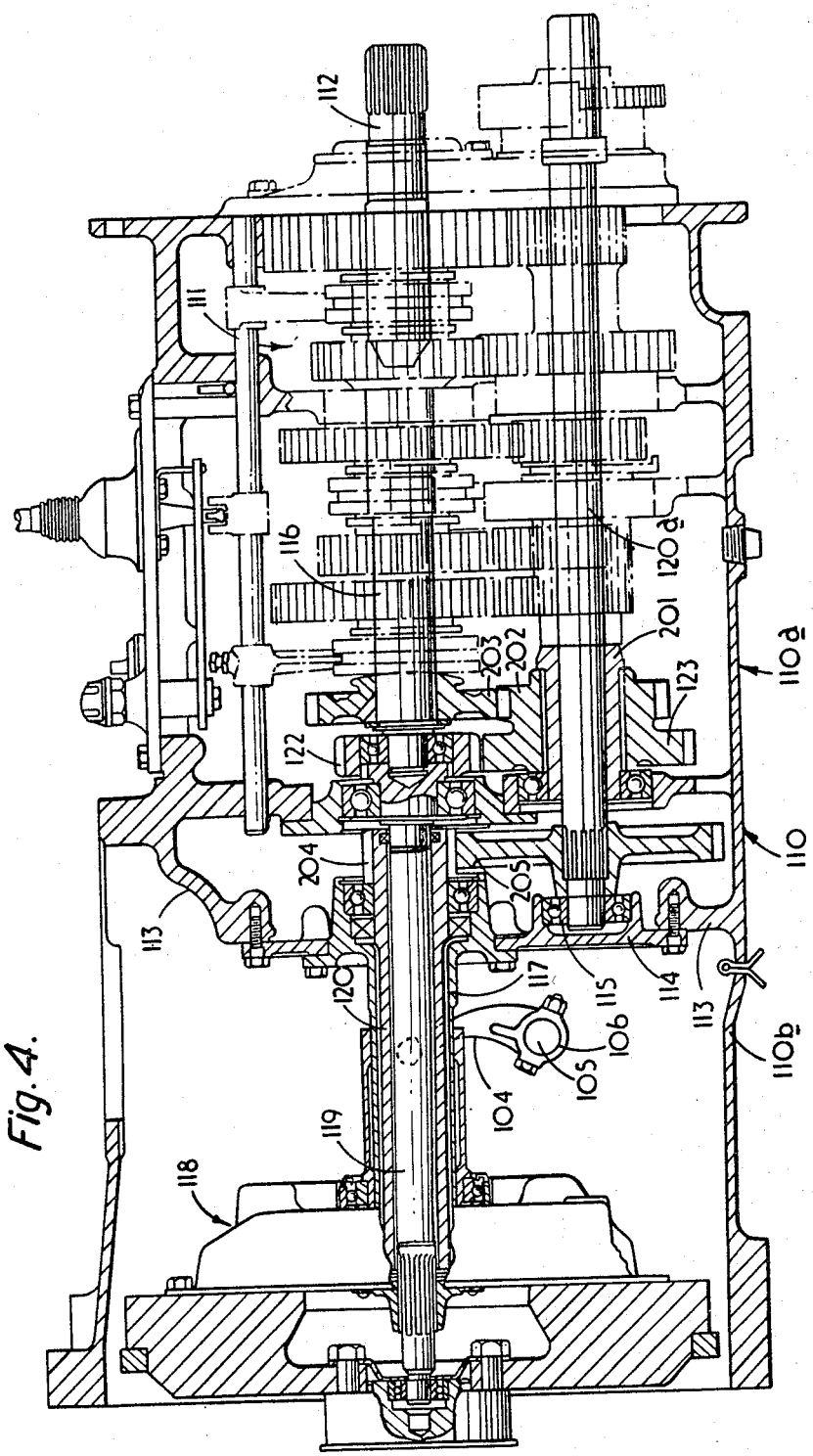
FIGURE 4 is a schematic cross-section side view of a second known form of tractor power transmission of the kind specified having a gear case in which the output drive shaft of a multi-speed gear is concentric with the crank shaft of the power unit and, in which the power-take-off drive shaft extends parallel to and spaced from the output drive shaft.
Figure 5:
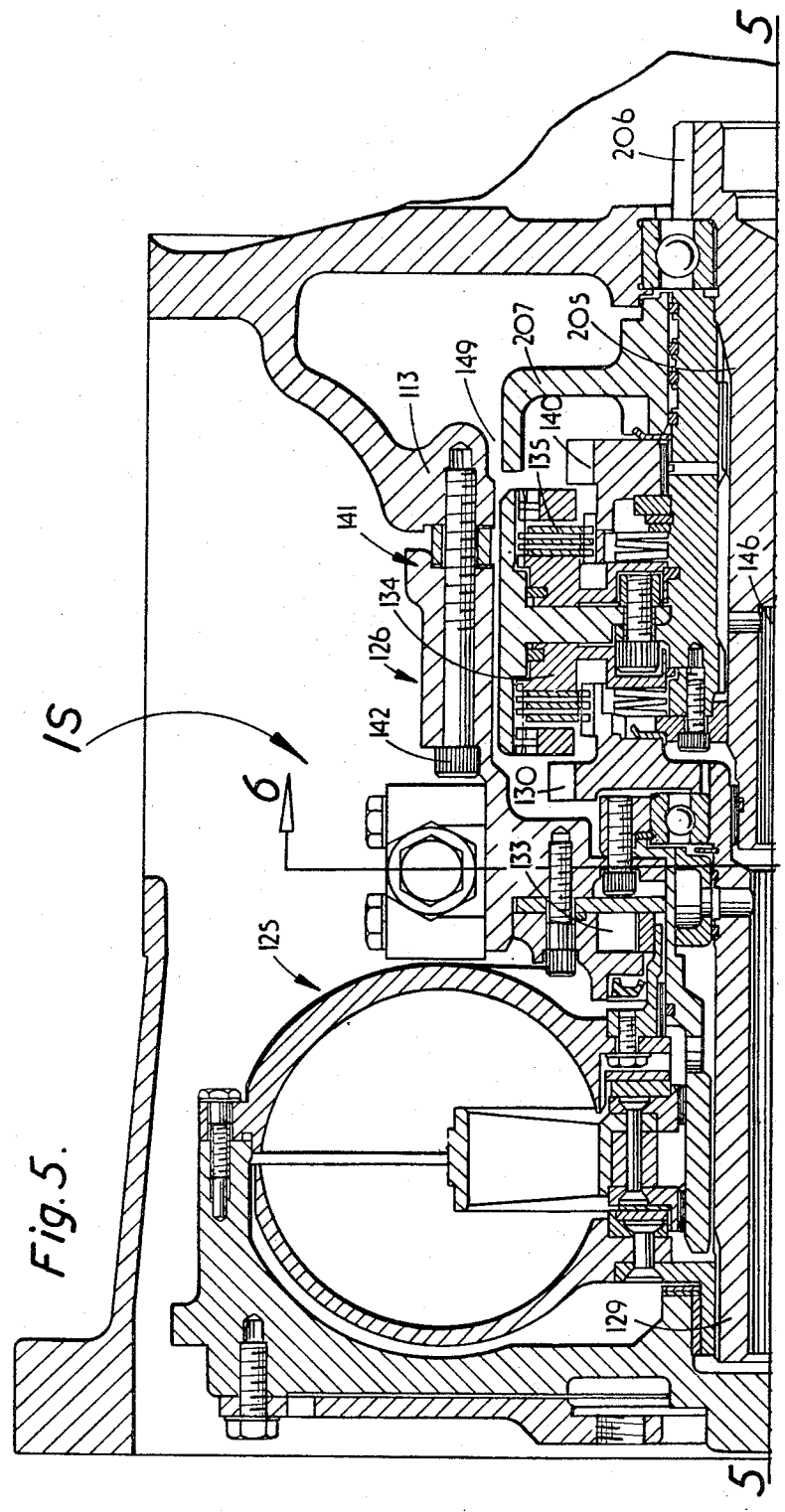
Figure 8:
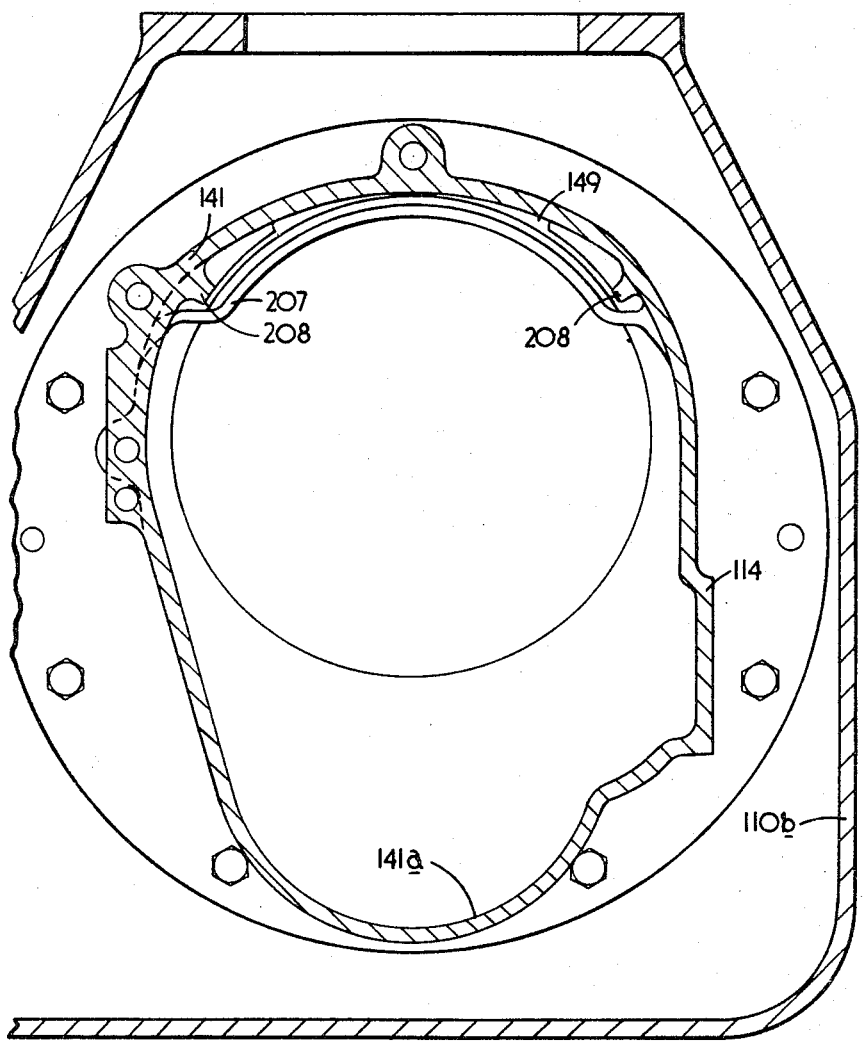

FIGURES 5 and 5A comprise an enlarged cross-sectional side view of the hydro-kinetic torque converter and power shift reversing gears adapted to be fitted in the portion of the gear case of FIGURE 4 adjacent the power unit of the tractor, the two figures being views on opposite sides of the centre line 5—5;

FIGURE 6 is a section to a reduced scale on line 6—6 of FIGURES 5 and 5A showing the arrangement of part of the hydraulic circuit of the hydro-kinetic torque converter and the control means for the power shift reversing gears;

FIGURE 7 is a further side view partly in section of the power shift reversing gears of FIGURES 5 and 5A showing the oil discharge means;

FIGURE 8 is a section on line 8—8 of FIGURE 7.

Figure 1:
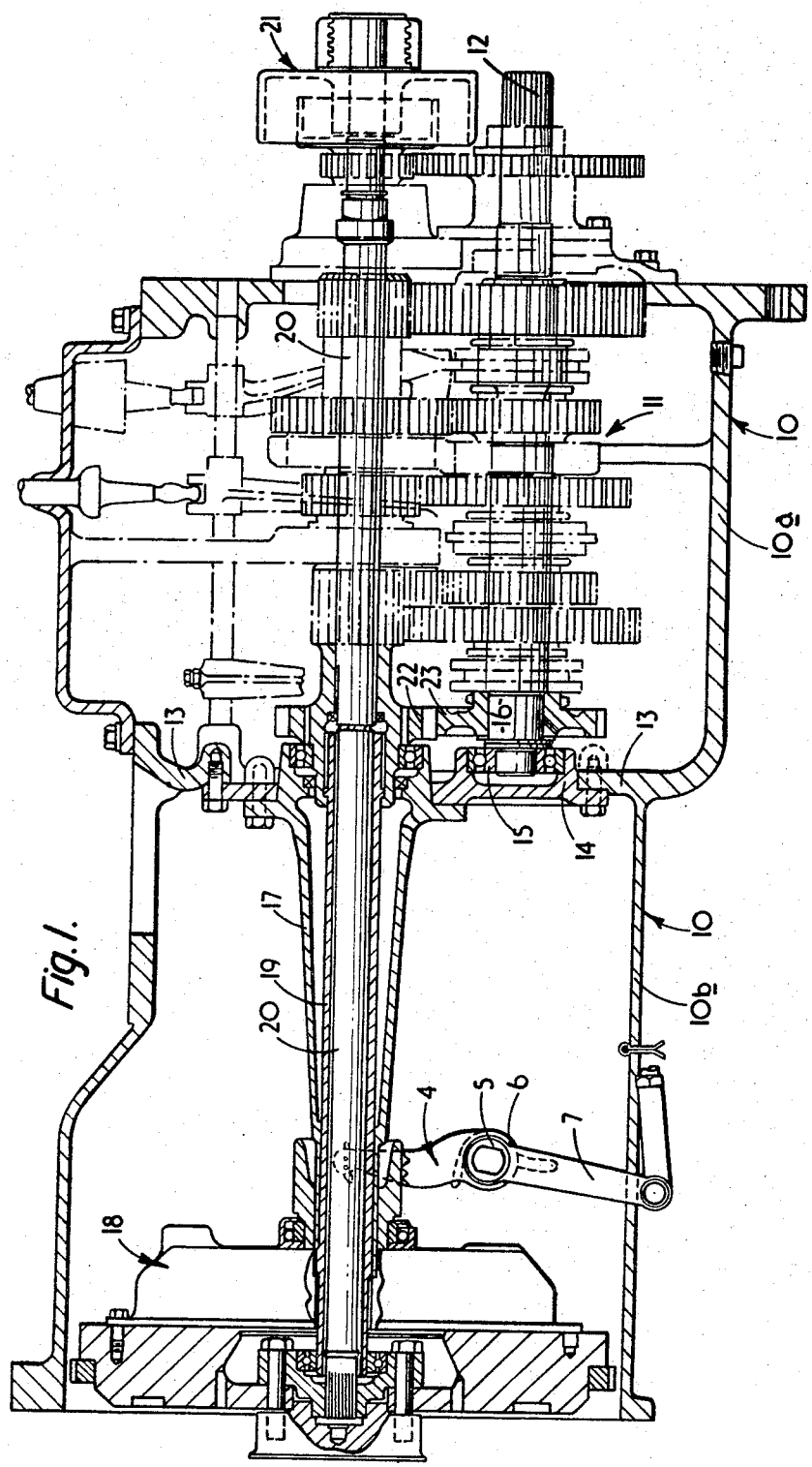

Referring to the first embodiment of the invention in FIGURE 1 the gear case generally depicted at 10 constitutes a complete enclosure for a power transmission of the kind specified. The output portion 10a of the gear case 10 accommodates a crash type multi-speed gearing 11 of conventional form which is merely shown in the drawing schematically as the arrangement of the multi-speed gear forms no part of the present invention, the multi-speed gearing 11 in known manner is arranged to provide for a number of different gear ratios and the output driving member 12 thereof is arranged to drive the tractor wheels or the track in the case of a tracked tractor in known manner.

The input portion 10b of the gear case 10 is provided with internal webs 13 to which are connected a support housing 14 for a bearing 15 in which the input drive member 16 of the multi-speed gearing 11 is rotatably received. The internal webs 13 further provide a support for bearing and supporting assembly 17 connected to the support housing 14.

The drive means for transmitting drive when desired to the multi-speed gear 11 comprises a clutch of known kind generally designated at 18 which is arranged to transmit power from the power unit (not shown) to the main drive shaft 19 of the transmission which is supported by the bearing and supporting assembly 17.

The power-take-off drive comprises a shaft 20 which is rotatably received within and concentric with the main drive shaft 19. The arrangement in this first known form of power transmission is such that both the power-take-off drive shaft 20 is driven from the crank shaft and therefore is rotated continuously when the power unit is operating, the power-take-off drive to a power-take-off shaft (not shown) being engageable, and disengageable by a clutch 21 supported outside the gear case 10, the operation of the clutch 21 being controlled independently by the operator when drive to a power-take-off shaft is required.

Power is transmitted from the power unit to the wheels or equivalent of the tractor in known manner through the multi-speed gearing 11 which may be driven by means of a gear 22 in driving engagement with the main drive shaft 19. The gear 22 may drive the shaft 16 of the multi-speed gearing 11 through a further gear 23 and, in known manner drive is transmitted at varying ratios to the output shaft 12 of the multi-speed gear 11.

The clutch 18 housed in the input portion 10b of the gear case 10 is operated by a clutch selector fork 4 mounted on a spindle 5 extending between opposed walls of the input portion 10b and mounted at each end for pivotal movement in trunnion bearings 6, each trunnion being mounted in an aperture formed in the gear case wall. The clutch selector fork 4 is operated in any known manner by a control arm 7 mounted outside the gear case on one end of the shaft 5 protruding through the aperture in the gear case.

Figure 2A:
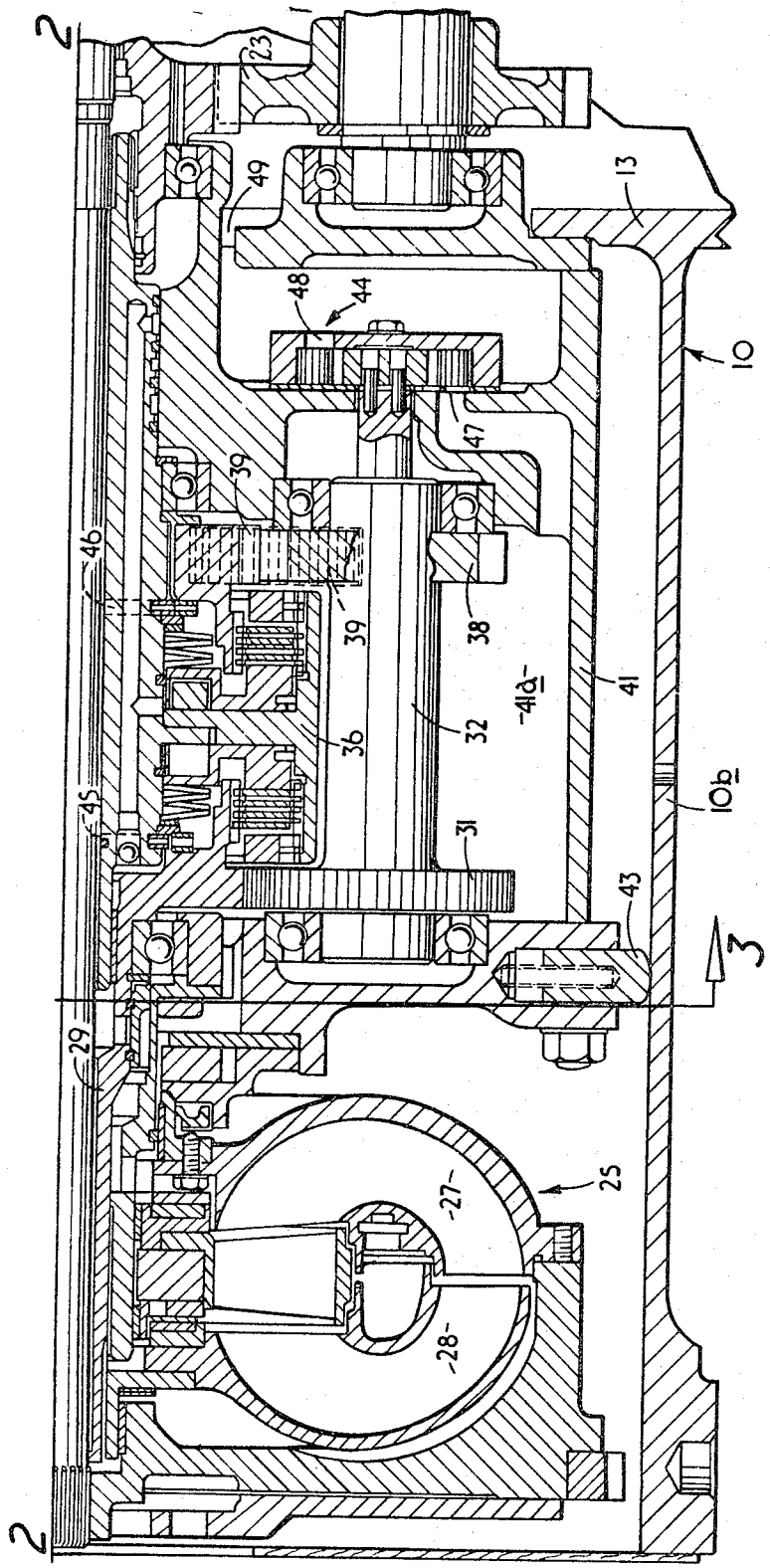
Figure 3:
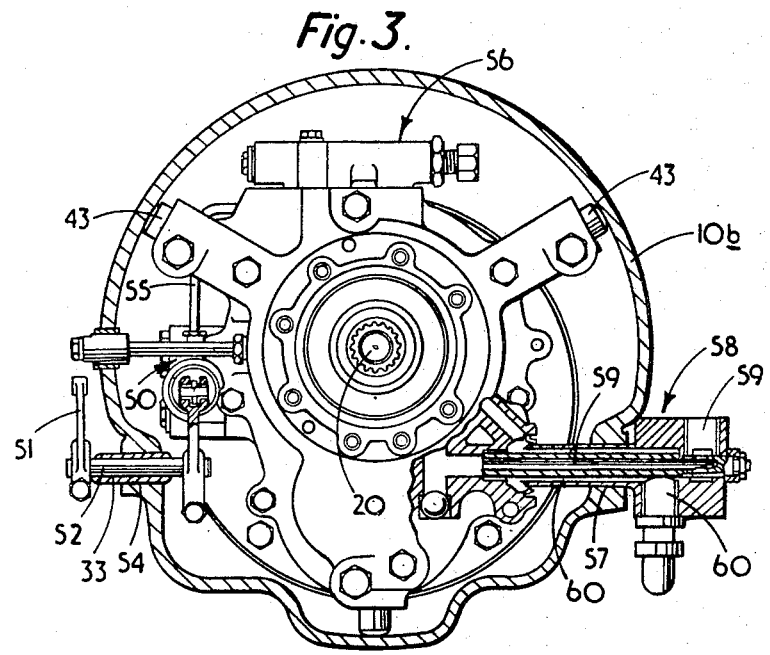
FIGURE 3 is a section to a reduced scale on line 3—3 of FIGURES 2 and 2A showing the arrangement of part of the hydraulic circuit of the hydro-kinetic torque converter and the control means for the power shift reversing gears.

In order to convert the aforedescribed first known form of power transmission as depicted in FIGURE 1 to the modified power transmission according to the present invention as shown in FIGURES 2, 2A and 3, various parts of the known power transmission all of which parts are accommodated in the input portion 10b of the gear case 10 are removed and replaced by a sub-assembly generally designated at S. This sub-assembly embodies (see FIGURES 2 and 2A) a hydro-kinetic torque converter 25 and power operated shift reversing gears generally depicted at 26.

In effecting the conversion aforementioned of the power transmission depicted in FIGURE 1, clutch 18 and clutch selector fork 4 together with its associated spindle 5, trunnion bearings 6 and control lever 7 are removed, and the main drive shaft 19 and its support and bearing 17 are also removed. If required the power-take-off drive shaft 20 may be retained, but it can be dispensed with completely.

The sub-assembly S is now disposed within the input portion 10b of gear case 10 so that as shown in FIGURES 2 and 2A this now houses the hydro-kinetic torque converter 25 together with the power operated shift reversing gears 26 instead of the parts which have been removed.

The hydro-kinetic torque converter 25 has an impeller element 27 which is connected to the engine crank shaft (not shown) and further, has a turbine element 28 which is connected to a driving member 29. A gear 30 of the driving member 29 is arranged to transmit drive to the power operated shift reversing gears 26 by the engagement of gear 30 with gear 31 of lay shaft 32 of the power shift reversing gears 26.

The impeller element 27 is also arranged to drive a pump 33 for supplying oil at the desired pressure to the interior of the hydro-kinetic torque converter 25 and to the operating means for the power shift reversing gears 26.

The power shift reversing gear incorporates a pair of hydraulically operated friction clutches 34 and 35 for providing forward and reverse drives. The clutch 34 when engaged provides a direct forward drive to the multi-speed gearing 11 in the following manner. Driving member 29 and associated gear 30 transmit power through clutch 34 to a drive transmitting member 36 which is connected to the output drive member 37 of the power shift reversing gear 26. The gear 22 of the original transmission is in driving engagement with the output drive member 37 of the power shift reversing gear and as aforedescribed transmits drive to the multi-speed gearing 11 by means of its driving engagement with gear 23.

The clutch 35 when engaged provides the reverse gear drive in the following manner. Drive from the driving member 29 and associated gear 30 is transmitted through lay shaft 32 by the engagement of gear 30 with gear 31. Gear 38 of the lay shaft 32 drives the idler 39 which transmits drive to the drive transmitting member 36 through gear 40 and the engaged clutch 35 to transmit reverse drive to the output drive member 37 to the multi-speed gear 11 in the manner just mentioned.

The power shift reversing gear 26 is mounted in the input portion 10b of the gear case by means of a housing 41 forming part of the sub-assembly which is rigidly connected to the existing webs 13 of the gear case 10 by bolts 42. The housing 41 is further supported in the input portion 10b of the gear case by abutments 43 which in known manner are adjustable so that the housing 41 and internal mechanism may be centralised in the gear case on mounting therein.

The housing 41 provides in the lower portion 41a thereof an oil sump from which oil may be discharged into the oil sump of the multi-speed gearing 11 housed in the output portion 10a of the gear case by a roller type pump 44 driven by the lay shaft 32.

Oil enters the oil sump of housing 41 in the form of cooling oil supplied to the power shift reversing gear from the hydro-kinetic torque converter through oil passageways 45, 46, and further oil may leak into the sump from the pump 33 associated with the hydro-kinetic torque converter 25.

The inlet and outlet orifices 47, 48, respectively of the roller type pump 44 are disposed at levels in the housing 41 corresponding to below and at the extent of the outer periphery of the member 36 of the rotatable clutches 34, 35. The level of the inlet orifice is arranged so that the level of oil obtaining in the oil sump of the housing 41 is always maintained lower than the extent of the outer periphery of the member 36 and, therefore the clutches will not be impeded during rotation by oil drag as would be incurred if the oil was not discharged from the housing 41 and could attain a level above the level of the member 36 of the clutches 34, 35.

Oil is discharged from the outlet orifice 48 of the roller type pump 44 into the output portion 10a of the gear case 10 through a passageway 49 from which oil drains into the sump of the multi-speed gearing 11. Should the level in the output portion 10a be abnormally high, such as when the tractor is inclined, the oil is prevented from entering the oil sump in the output portion 10a due to the constant positive displacement of oil by the roller type pump 44 and the relatively high oil pressure obtaining in the passageway 49.

Referring to FIGURE 3, the operation of the two clutches 34, 35, is controlled by a selector valve 50 which is operated by a lever 51 mounted on a spindle 52 supported for pivotal movement in a bearing 53 housed in the aperture 54 of the gear case which previously housed one of the trunnion bearings 6 aforedescribed with reference to FIGURE 1. The selector valve 50 in known manner is arranged to provide, when desired, a supply of pressurised hydraulic fluid to either one of the clutches 34, 35, with oil being supplied to the selector valve 50 from the pump 33 through a conduit 55. In order to prevent excess pressure obtaining in the hydraulic operating means for the clutches 34, 35, a pressure control valve 56 is provided which also in known manner controls the pressure obtaining in the oil supply line from the pump 33 and permits excess oil to flow to the hydro-kinetic torque converter 25.

The other aperture 57 formed in the wall of the input portion 10b of the gear case which originally housed the other trunnion bearing 6 of the clutch operating selector fork 4 now accommodates a hydraulic conduit member generally designated at 58. The member 58 provides firstly an oil passageway 59 leading from the hydro-kinetic torque converter which may lead to an oil cooler (not shown) arranged outside the casing from where the oil may be fed to the oil sump of the output portion 10a of the gear case and, secondly provides a return oil passageway 60 leading from the oil sump in the output portion to the pump 33. Conveniently, the return passageway 60 is arranged concentric with the passageway 59 in the portion of the member 58 extending through the aperture 57.

From the aforedescribed embodiment of the present invention as applied to the first known form of power transmission of the kind specified it can be seen that the sub-assembly S including the hydro-kinetic torque converter and power shift reversing gears may be conveniently fitted within the gear case 10 without any special modification thereto so as to provide economically the modified power transmission of the present invention.

Now will be described the second embodiment of the present invention utilising the second form of known power transmission of the kind specified to provide the modified power transmission.

In the following description referring to FIGURES 4, 5, 5A, 6, 7 and 8, similar parts which are common to the first and second embodiment of the invention have similar reference numerals except that in the second embodiment the reference numerals are prefixed by the number 1.

Referring to FIGURE 4 the gear case is generally depicted at 110 and embodies an input portion 110b and an output portion 110a the input portion accommodates a clutch 118 for transmitting drive to a main drive shaft 119. The multi-speed gear 111 housed in the output portion 110a is driven from the main drive shaft 119 by gear 122 through gear 123 mounted on lay shaft 201 then through gears 202 and 203 to the main input shaft 116 of the multi-speed gearing 111.

The power-take-off drive shaft 120 extends around and is concentric with the main drive shaft 119. The power-take-off drive shaft 120 is adapted to be driven from the power unit by means of a driving connection through a driven part of the clutch 118 and power-take-off is transmitted from the power-take-off drive shaft 120 to a secondary power-take-off drive shaft 120a mounted in the output portion 110a by means of a gear 204 forming part of the drive shaft 120 and gear 205 mounted on the secondary power-take-off drive shaft 120a.

As in the aforedescribed first embodiment the gear case 110 is provided with integral interval webs 113, but in this second form the webs 113 have connected thereto a support plate 114 in which a bearing assembly 115 for the secondary power-take-off shaft 120a is rotatably received, the webs 113 further provide a support for a support and bearing assembly 117 connected to the support plate 114. The support and bearing assembly 117 provides rigid mounting for the power-take-off drive shaft 120 as well as a bearing for the clutch 118.

Also as in the aforedescribed embodiment the clutch 118 is operated by a clutch selector fork 104 which is mounted on a spindle 105 supported by trunnion bearings 106 mounted in apertures formed in opposed side walls of the input portion 110b of the gear case 110. Furthermore, the multi-speed gearing 111 is arranged to provide a multiplicity of gear ratios to an output drive member 112 arranged to transmit power to the wheels or other ground engaging means of the tractor. The power-take-off drive is transmitted from the secondary power-take-off drive shaft 120a to a power-take-off shaft (not shown).

In the first form of known power transmission the two parallel drive shafts accommodated within the output portion of the gear case comprise the power-take-off drive shaft 20 concentric with the crank shaft and the input and output shafts 16 and 12 of the multi-speed gearing and spaced therefrom, whereas in this second form of known power transmission the two parallel drive shafts comprise, the input and output shafts of the multi-speed gearing which are arranged concentric with the crank shaft and the secondary power-take-off shaft spaced therefrom.

In order to convert this second known form of power transmission as depicted in FIGURE 4 to the modified power transmission according to the present invention, as aforedescribed the various parts of the known power transmission are replaced by sub-assembly 1S (see FIGURES 5 and 5A) again embodying a hydro-kinetic torque, converter and power shift reversing gears. In effecting this conversion clutch 118 and a clutch selector fork 104 together with its associated spindle 105, trunnion bearings 106 and the control lever (not shown) are removed, the main drive shaft 119 together with the power-take-off drive shaft 120 and its support and bearing assembly 117 are also removed. In this second form of known power transmission it is not convenient to retain the power-take-off drive shaft 120 and as this is removed the secondary power-take-off drive shaft 120a is also removed together with the associated gear 205, bearing 115 and, support 114 therefor. The removal of the secondary power-take-off shaft does not interfere in any way with the continued operation of the multi-speed gearing 111.

The sub-assembly 1S shown in FIGURES 5 and 5A for converting the aforedescribed second form of known power transmission comprises a hydro-kinetic torque converter 125 together with power shift reversing gears generally depicted at 126. As previously described with reference to FIGURES 2 and 2A the hydro-kinetic torque converter 125 has an impeller element which is connected to the engine crank shaft (not shown) and further has a turbine element for transmitting drive to drive shaft 129. The gear 130 integral with the driving member 129 is arranged to transmit drive to the power operated shift reversing gear 126 through gear 131 of lay shaft 132 of the power shift reversing gears 126.

The impeller of the hydro-kinetic torque converter is also arranged to drive a pump 133 for supplying oil at the desired pressure to the interior hydro-kinetic torque converter 125 and to the means for hydraulically operating the power shift reversing gear 126.

The power shift reversing gear 126 embodies similar apparatus as that aforedescribed with reference to the first embodiment of FIGURES 2 and 2A. These parts comprise a pair of friction clutches 134, 135, which provide forward or reverse drive through drive shaft 205 having an integral gear 206 which is arranged to transmit drive to the aforedescribed gear 123 associated with the multi-speed gearing 111.

The power shift reversing gear 126 is mounted in the input portion 110b of the gear case by means of a housing 141 forming part of sub-assembly 1S. The housing 141 is rigidly connected to the existing webs 113 of the gear case 110 by bolts 142.

The housing 141 provides in the lower portion thereof 141a an oil sump through which oil may be discharged into the oil sump of the multi-speed gearing 111 housed in the output portion 110a of the gear case by means adapted to discharge the oil through a passageway 149 provided by an aperture between the upper portion of the housing 141 and a further member 207 of the power-shift reversing gear 126.

The oil enters the oil sump of housing 141 in the form of cooling oil supplied to the power shift reversing gear from the hydro-kinetic torque converter through oil passageways 146, 147, and further oil may leak into the sump from the pump 133 associated with the hydro-kinetic torque converter 125.

In order to describe the means for maintaining the oil level in the oil sump in the housing 141 below the extent of the periphery of the clutches 134 and 135, we now refer to FIGURES 7 and 8.

Internally of the housing 141 there is provided an inclined ledge 208 which projects inwardly from the housing towards the clutches 134, 135, and the uppermost portion thereof extends towards the oil passageway 149 and terminates adjacent thereto.

On rotation of the clutches 134, 135 if the oil level be such that the clutches contact the oil then oil is dragged upwardly towards the ledge 208 to impinge thereon. The ledge 208 acts as a dam to prevent further drag of the oil and directs the oil to cause it to flow through the passageway 149 from whence it drains into the oil sump of the multi-speed gearing 111. The ledge 208 effectively causes displacement of the oil dragged up by rotation of the clutches in that due to the high speed of rotation of the clutches the oil tends to be thrown tangentially from the clutches during their rotation onto the internal wall of the housing 141. Thus, in this arrangement as soon as the level of oil in the sump of the housing 141 reaches the level of the extent of the outer periphery of the clutches 134, 135, oil is discharged positively from the oil sump by means of the rotation of the clutches 134, 135, and the damming and directing effect of the ledge 208.

The oil sump of housing 141 is quite separate from the oil sump of the change speed gearing 111 housed in the output portion of the gear case. Oil contained within the oil sump of the multi-speed gear case can not flow under normal conditions into the oil sump of the housing 141 and, by providing the aperture 149 at the uppermost portion of the housing 141, it is extremely unlikely that oil from the multi-speed gearing could ingress into the housing 141 for in operation the rate of oil flowing into the housing 141 will be such that oil is more or less constantly discharged through the passageway 149.

Referring to FIGURE 6, the operation of the two clutches 134, 135, is in similar manner as the aforedescribed first embodiment controlled by a selector valve 150 which is operated by a lever 151 mounted on a spindle 152 supported for pivotal movement in a bearing 153 housed in the aperture 154 of the gear case which previously housed one of the trunnion bearings 106 aforedescribed with reference to FIGURE 4. Oil is supplied to the selector valve 150 from the pump 133 through a conduit 155 and, to prevent excess pressure obtaining in the hydraulic operating means for the clutches 134, 135, a pressure control valve 156 is provided to control the pressure in the clutch operating means and permits excess oil to flow to the hydro-kinetic torque converter 125.

The other aperture 157 formed in the wall of the gear case in like manner as aforedescribed now accommodates a hydraulic conduit member generally designated at 158 which is substantially the same as that described in the first embodiment and is therefore not described again.

From the aforedescribed embodiment of the present invention as applied to the second known form of power transmission of the kind specified it can be seen that the hydro-kinetic torque pressure and power shift reversing gear may be conveniently fitted within the gear case 100 without special modification thereto and, that substantially all of the parts of the multi-speed gearing 111 may be retained.

It is envisaged that in both of the embodiments of the present invention the return of cooled oil from the oil cooler may be provided by a separate pipe which may extend through an opening especially drilled in the output portion of the casing, but such drilling would not in any way effect the configuration or use of the existing gear case with the modified power transmission of the present invention.

What I claim then is:

1. In power transmission apparatus for vehicles having a power plant, transmission and drive wheels in which the transmission includes a casing having a input portion adjacent to the power plant of the vehicle and an output portion separated from the input portion by an integral internal web having an axial opening and with a multi-speed gearing disposed in the output portion of said casing with an output shaft connectible to the drive wheels of the vehicle and adapted to provide multiple gear ratios for movement of the vehicle, the improvement comprising a hydro-kinetic torque converter mounted in the input portion of said casing and having portions connectible to said power plant, a power operated shift reversing mechanism mounted in the input portion of said casing adjacent to and in alignment with said torque converter, means for driving said shift reversing mechanism from said torque converter, said shift reversing mechanism including an output drive member extending through said internal web and drivingly connected to said multi-speed gearing, a drive transmitting means connected to said output drive member, a first clutch means selectively operable to connect said shift reversing mechanism driving means to said drive transmitting means to drive said output drive member in a forward direction, shaft means spaced from and disposed generally parallel to said drive transmitting means, first gear means drivingly connecting one end of said shaft means to said shift reversing driving means, second gear means mounted on the opposite end of said shaft means and drivingly connectible to said drive transmitting means, a second clutch means selectively operable to connect said second gear means to said drive transmitting means to drive said output drive member in a reverse direction, a housing mounting said power shift reversing mechanism in said casing and providing an oil sump, oil discharge means within said housing, fluid pump means connected to be driven by said torque converter, selector valve means carried within the output portion of said casing and adapted to direct fluid under pressure from said pump means to said first clutch means or said second clutch means to provide selective operation thereof, selector valve operating means extending through a first aperture in one side of said casing, a fluid conduit member extending through a second aperture in the other side of said casing and disposed generally diametrically opposite said first aperture, said fluid conduit member providing a first passageway from said torque converter to the output portion of said casing, said fluid conduit member having a second passageway arranged concentrically of said first passageway and connecting the output portion of the casing to said fluid pump means, whereby a torque converter and a shift reversing mechanism can be located in an existing gear casing for driving the vehicle.

2. The structure of claim 1 in which said oil discharge means within said housing includes pump means driven by said shaft means for discharging oil from said sump to said output portion.

References Cited

UNITED STATES PATENTS

| | | |
|---|---|---|
| 2,027,012 | 1/1936 | Barnes. |
| 2,241,002 | 5/1941 | Peterson _____ 74—745 |
| 2,328,519 | 8/1943 | Wahlberg _____ 184—6 X |
| 2,464,538 | 3/1949 | Vanderzee. |
| 2,487,735 | 11/1949 | Sherman et al. _____ 74—745 |
| 2,489,699 | 11/1949 | Clark. |
| 2,512,856 | 6/1950 | Fisk _____ 74—730 X |
| 2,536,737 | 1/1951 | Gerst _____ 74—745 X |
| 2,586,220 | 2/1952 | Gerst. |
| 2,887,199 | 5/1959 | Funk _____ 74—377 X |
| 2,916,934 | 12/1959 | Iavelli _____ 74—730 X |
| 2,975,656 | 3/1961 | Schou _____ 74—732 X |
| 3,099,166 | 7/1963 | Haverlender _____ 74—745 |

FOREIGN PATENTS

| | | |
|---|---|---|
| 461,947 | 2/1937 | Great Britain. |
| 508,750 | 7/1939 | Great Britain. |
| 736,521 | 9/1959 | Great Britain. |

FRED C. MATTERN, Jr., *Primary Examiner.*

DONLEY J. STOCKING, THOMAS C. PERRY,
*Examiners.*

J. R. BENEFIEL, *Assistant Examiner.*